UNITED STATES PATENT OFFICE.

LEONARD PHILIP WILSON, OF COVENTRY, ENGLAND, ASSIGNOR, BY MESNE ASSIGNMENTS, TO THE VISCOSE COMPANY, OF MARCUS HOOK, PENNSYLVANIA, A CORPORATION OF PENNSYLVANIA.

MANUFACTURE OF CELLULOSE COMPOUNDS.

1,279,200.  Specification of Letters Patent.  Patented Sept. 17, 1918.

No Drawing.  Application filed January 22, 1915. Serial No. 3,831.

*To all whom it may concern:*

Be it known that I, LEONARD PHILIP WILSON, a subject of the King of Great Britain, residing at "Rosemont," Holyhead Road, Coventry, in the county of Warwick, England, have invented new and useful Improvements in the Manufacture of Cellulose Compounds, of which the following is a specification.

In the manufacture of cellulose compounds, such as viscose, or xanthate of cellulose, one of the first steps is the preparation of alkali cellulose by treating cellulose with alkali, the alkali cellulose, before conversion into xanthate, being matured, or, as it is sometimes termed, "mercerized," which involves oxidation owing to the action of the atmosphere although such oxidation has been regarded as an action to be guarded against as much as possible.

In the copending application Glover and Wilson, Serial No. 3,830, filed on even date herewith, however, it is explained that it has been found that efficient oxidation is desirable and that the manufacture can be greatly expedited by supplying oxidizing agents (such, for instance, as air, oxygen, peroxids and hypochlorites) for the express purpose of effecting oxidation.

We have found that the oxidation is greatly assisted by the addition of a catalyst, or contact substance, such for example, as the oxids, or hydrates, of certain metals and especially the oxids, or hydrates, of iron, nickel, and cobalt.

The following are examples of how this invention may be performed but it is not limited to these examples.

*Example 1.*

5 kilos of cellulose (for example wood pulp, in sheets,) are soaked in a solution of ferrous sulfate containing 0.6 per cent. of $FeSO_4 + 7$ aq. and pressed, until the total weight is 8.5 kilos, and then dried. The cellulose then contains iron equivalent to about 0.1 per cent. of FeO. The cellulose thus treated is next steeped, in the ordinary, or any suitable, manner, for say about two hours, in caustic soda solution of 17½ per cent. content of NaOH, and alkali cellulose containing ferrous hydrate is formed which alkali cellulose is pressed to a weight of about sixteen kilos and milled and is then allowed to oxidize, for instance by keeping it in the usual closed boxes for a sufficient time (say from fifteen to twenty hours) which is about one quarter of the time hitherto required for oxidizing, or the oxidizing may be effected by exposing the cellulose treated as aforesaid, to a current of air at about 40° centigrade for about one hour. After treatment in either of these ways the product is ready for treatment with carbon-bisulfid.

*Example 2.*

5 kilos of cellulose (for example wood pulp, in sheets,) are soaked in a solution of nickel sulfate containing 1.35 per cent. of $NiSO_4$, 7 aq. and pressed until the total weight is 8.5 kilos, and then dried. The cellulose then contains nickel equivalent to about 0.25 per cent. of NiO. The cellulose thus treated, is then steeped, in any ordinary, or suitable manner, for thirty minutes, in caustic soda solution of 17½ per cent. content of NaOH, in which one per cent. of commercial sodium peroxid has been dissolved. The alkali cellulose is then pressed to a weight of about sixteen kilos, milled and immediately treated with carbon bisulfid.

Other oxidizing agents or mixtures thereof, and other methods of oxidation may be used, and we do not limit ourselves to the use of the particular catalysts hereinbefore specifically named, as others which will assist oxidation may be employed with good results; for example, oxids, or hydrates of cerium, or of vanadium may be used.

What I claim is—

1. In the manufacture of cellulose compounds the treatment of alkali-cellulose with an oxidizing agent and a catalyst added to assist the action of the oxidizing agent on the alkali-cellulose.

2. In the manufacture of cellulose compounds, the treatment of alkali-cellulose with an oxidizing agent and a hydroxid of a metal of the iron group which will assist the action of the oxidizing agent on the alkali-cellulose.

3. The manufacture of cellulose compounds, by soaking cellulose in a solution of ferrous sulfate and pressing and drying and then steeping in caustic soda solution of sufficient quantity and strength to form alkali-cellulose, pressing and milling the alkali-cellulose formed and then allowing it to oxidize, substantially as hereinbefore described.

In testimony whereof I have signed my name to this specification in the presence of two subscribing witnesses.

LEONARD PHILIP WILSON.

Witnesses:
ERNEST HARKER,
STELLA BENSON.